United States Patent
Endo et al.

(10) Patent No.: US 12,544,851 B2
(45) Date of Patent: Feb. 10, 2026

(54) RESISTANCE SPOT WELDING METHOD AND METHOD FOR MANUFACTURING RESISTANCE SPOT WELDED JOINT

(71) Applicant: JFE STEEL CORPORATION, Tokyo (JP)

(72) Inventors: Reiko Endo, Tokyo (JP); Muneo Matsushita, Tokyo (JP); Yasuaki Okita, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 693 days.

(21) Appl. No.: 17/908,799

(22) PCT Filed: Mar. 1, 2021

(86) PCT No.: PCT/JP2021/007786
§ 371 (c)(1),
(2) Date: Sep. 1, 2022

(87) PCT Pub. No.: WO2021/177254
PCT Pub. Date: Sep. 10, 2021

(65) Prior Publication Data
US 2023/0339037 A1 Oct. 26, 2023

(30) Foreign Application Priority Data
Mar. 5, 2020 (JP) .................. 2020-037467

(51) Int. Cl.
*B23K 11/11* (2006.01)
*B23K 101/18* (2006.01)
*B23K 103/04* (2006.01)

(52) U.S. Cl.
CPC ......... *B23K 11/115* (2013.01); *B23K 2101/18* (2018.08); *B23K 2103/04* (2018.08)

(58) Field of Classification Search
CPC .............. B23K 11/115; B23K 2101/18; B23K 2103/04; C22C 38/002; C22C 38/02;
(Continued)

(56) References Cited

U.S. PATENT DOCUMENTS 9,475,147 B2  10/2016  Taniguchi et al.
2012/0141829 A1  6/2012  Oikawa et al.
(Continued)

FOREIGN PATENT DOCUMENTS

JP  2003-236674 A  8/2003
JP  2004-090037 A  3/2004
(Continued)

OTHER PUBLICATIONS

Apr. 27, 2021 International Search Report issued in Patent Application No. PCT/JP2021/007786.
(Continued)

*Primary Examiner* — Chris Q Liu
*Assistant Examiner* — James F Sims, III
(74) *Attorney, Agent, or Firm* — Oliff PLC

(57) ABSTRACT

Provided are a resistance spot welding method and a method for manufacturing a resistance spot welded joint. At least one of the steel sheets used is a high strength steel sheet. The method includes a main current application step in which current is applied with a current $I_w$ and a tempering post-heat treatment step. The tempering post-heat treatment step includes a cooling process and a heating process and can include at least one of a transition process and a holding process. In the heating process, a current is applied at a current value $I_t$, shown in formula (2), for a current application time $t_t$.

$$0.8 \times I_w \leq I_t \leq 1.6 \times I_w \quad (2)$$

4 Claims, 2 Drawing Sheets

(58) Field of Classification Search
CPC ......... C22C 38/04; C22C 38/06; C22C 38/08; C22C 38/12; C22C 38/14; C22C 38/16; C22C 38/32; C22C 38/38
USPC ........................................................ 219/91.2
See application file for complete search history.

(56) References Cited

U.S. PATENT DOCUMENTS

2016/0067814 A1* 3/2016 Furusako ............... B23K 11/24
 219/86.7
2021/0237193 A1 8/2021 Aoki et al.

FOREIGN PATENT DOCUMENTS

| JP | 2009-241086 A | 10/2009 |
|---|---|---|
| JP | 2011-067853 A | 4/2011 |
| JP | 5293227 B2 | 9/2013 |
| JP | 2014-176856 A | 9/2014 |
| WO | 2019/156073 A1 | 8/2019 |
| WO | 2019203364 A1 | 10/2019 |

OTHER PUBLICATIONS

Jan. 19, 2024 Extended European Search Report issued in Application No. 21765043.1.

* cited by examiner

RESISTANCE SPOT WELDING METHOD AND METHOD FOR MANUFACTURING RESISTANCE SPOT WELDED JOINT

TECHNICAL FIELD

The present application relates to a resistance spot welding method and a method for manufacturing a resistance spot welded joint.

BACKGROUND

In recent years, various high strength steel sheets (high-tensile steel sheets) have been increasingly used in automobile bodies, to achieve a weight reduction for improving fuel economy and to ensure crash safety. In automobile assembly lines, the joining of members including such a high strength steel sheet is mainly carried out by using resistance spot welding (which may hereinafter also be referred to as "spot welding"). Regarding a joint strength of a spot weld resulting from spot welding, ensuring crash safety as mentioned above requires that the joint have a strength (tensile strength) sufficient to prevent a fracture even when crash deformation occurs. The joint strength of the spot weld is evaluated based on a tensile shear strength (which may hereinafter also be referred to as "TSS"), which is a tensile strength in a shear direction, and a cross tension strength (which may hereinafter also be referred to as "CTS"), which is a tensile strength in a peeling direction.

The TSS of the spot weld tends to increase with an increase in tensile strength of the base metal, whereas the CTS thereof may be decreased when the tensile strength of the base metal is 980 N/mm² or greater (980 MPa or greater). In instances where CTS is decreased, the fracture mode changes from a plug fracture, which is a ductile fracture that occurs in the base metal or a heat-affected zone (HAZ) around the spot weld, to an interfacial fracture or a partial plug fracture, which is a brittle fracture that occurs within the nugget. A major cause of the decrease in CTS is believed to be the hardening of a nugget edge after quenching, which leads to the occurrence of a brittle fracture. In the related art, to solve the problem, various studies have been conducted regarding methods for postheating, which is reheating performed after a main current application.

For example, the technologies of Patent Literature 1 to 3 are directed to methods for the postheating that is reheating performed after a main current application.

Patent Literature 1 discloses that improvement in CTS is achieved as follows: immediately after a welding current application is performed, cooling is carried out for a post-welding cooling time Ct (ms), which satisfies 20≤Ct≤300, and thereafter, post-cooling postheating is performed for a post-cooling subsequent heating current application time (post-cooling postheating time) Pt2 (ms), which satisfies 40≤Pt2≤200, with a predetermined current.

Patent Literature 2 discloses that improvement in CTS is achieved as follows: immediately after a welding current application is performed, a cooling time that satisfies 20≤CT≤40 is allowed to pass, and thereafter, postheating is performed for a post-cooling subsequent heating time (post-cooling postheating time) (ms) that satisfies 40≤PHT2≤200, with a predetermined current.

Patent Literature 3 discloses that CTS is increased by using a tempering postheating method, in which after formation of a nugget, cooling is carried out for a long time, and thereafter, postheating is performed for a short time at a current value higher than that of the initial current application.

CITATION LIST

Patent Literature

PTL 1: Japanese Unexamined Patent Application Publication No. 2011-67853
PTL 2: Japanese Unexamined Patent Application Publication No. 2009-241086
PTL 3: Japanese Patent No. 5293227

SUMMARY

Unfortunately, in instances where cooling for a short time and postheating for a short time are employed, as in the technologies of Patent Literature 1 and 2, martensitic transformation cannot be caused in the region around the nugget edge, and formation of a tempered martensite structure cannot be achieved in the region around the nugget edge. As a result, an effect of improving toughness due to tempering cannot be produced, which makes it impossible to achieve a consistent joint strength.

The technology described in Patent Literature 3 uses a very short current application time of 0.02 seconds or more and 0.1 seconds or less for the postheating. In instances where the technology of Patent Literature 3 is applied to a steel sheet in which a high amount of Mn, which is a steel sheet component, is included, in particular, to a steel sheet containing Mn in an amount of 1.5 to 6.0 mass % and C in an amount of 0.05 to 0.60 mass % (hereinafter, such a steel sheet is referred to as a "high strength steel sheet"), there is a tendency for a microstructure to become brittle because of the high amounts of C and Mn. For the tempering of the brittle microstructure, using the above-described method, in which postheating is performed for a very short tempering time, poses difficulties in producing a sufficient tempering effect in instances of welding a high strength steel sheet.

Furthermore, in instances where a spot welding method of the related art in which only a main current application is performed is employed for a high strength steel sheet having a tensile strength of 780 MPa or greater and containing Mn in an amount of 1.5 to 6.0 mass % and C in an amount of 0.05 to 0.60 mass %, each being a steel sheet component, the problem of low CTS is encountered.

Furthermore, TSS is a standard representing a strength regarding instances in which the spot weld is peeled in a shear direction, and, therefore, for automobile body applications, TSS serves as a requisite strength criterion in terms of improving safety. However, the tempering postheating, which is used to improve CTS, causes softening of a nugget, which may result in a decrease in TSS. Accordingly, there exists a need for further improvement in both CTS and TSS over those of the related art.

In one aspect, the disclosed embodiments have been made in view of the problems described above, and an object of the present disclosure is to provide a resistance spot welding method and a method for manufacturing a resistance spot welded joint that, by using tempering, reduce embrittlement of a nugget due to quenching of a spot weld and, accordingly, improve a joint strength even in instances in which a high strength steel sheet, namely, a high strength steel sheet having a tensile strength of 780 MPa or greater, is used.

In connection with the present disclosure, to solve the problems described above, studies were diligently performed to examine the mechanism that causes the decrease in CTS in the resistance spot weld of a sheet combination including a high strength steel sheet such as that described above and to develop a method for improving CTS.

As described above, CTS decreases as the strength of a steel sheet increases. A cause of the decrease is a decrease in toughness of the nugget edge and the heat-affected zone (HAZ) adjoining the nugget edge caused by the formation of a hard structure due to quenching. The decrease in toughness of the nugget edge and the HAZ results in a brittle microstructure of the nugget edge, and, consequently, a crack can easily propagate into the nugget from the HAZ and cause an interfacial fracture. As a result, a low CTS is exhibited. On the other hand, when the toughness of the nugget edge is high, the crack that has propagated from the HAZ moves to the outside of the nugget, and the nugget remains; thus, a plug fracture is experienced. Accordingly, CTS is improved.

Thus, the present inventors directed their attention to forming tempered martensite as follows: the nugget formed by a main current application is subjected to a subsequent cooling process to cause martensitic transformation therein, and subsequently, reheating is performed to temper the martensite structure. Tempered martensite is a structure that exhibits higher toughness than as-quenched martensite. Accordingly, forming tempered martensite in the nugget edge mitigates stress concentration in the nugget edge. As a result, propagation of cracks into the nugget, which significantly affects the joint strength, can be inhibited, and, therefore, CTS is improved. The present inventors demonstrated that there are appropriate postheating conditions under which CTS associated with a high strength steel sheet such as that described above can be improved.

Specifically, a main current application is first performed, by which steel sheets are heated to a temperature greater than or equal to a melting temperature thereof to form a nugget. Subsequently, a cooling process is performed for carrying out quenching of the melted portion after solidification, to achieve a temperature at which a transformation from austenite to martensite occurs, and thereafter, a heating process is performed in which, for the purpose of carrying out heating in a temperature range immediately below an $A_1$ temperature, a current application is performed at a high temperature for a short time, which causes the nugget edge, in particular, to be heated at a high temperature. Furthermore, at least one of a transition process and a holding process is performed under predetermined conditions, which enables the temperature of the nugget edge to be maintained at a temperature less than or equal to the $A_1$ temperature, and, accordingly, the nugget edge can be tempered. It was discovered that providing these processes improves CTS compared with providing only a main current application.

Furthermore, the improvement in toughness in the nugget edge increases the strength of the weld (resistance spot weld). It was discovered that as a result of this, TSS is also further improved.

The results described above indicated that in instances where any of the current application patterns of the present disclosure, which will be described later, are used to perform resistance spot welding on a sheet combination including at least two overlapping steel sheets, the CTS of the resistance spot weld can be improved, and the TSS thereof can be further improved.

In some aspects, the present disclosure was made based on the above-described discoveries, and a summary of embodiments is as follows.

[1] A resistance spot welding method including holding a sheet combination between a pair of welding electrodes, the sheet combination including at least two overlapping steel sheets; and applying a current, together with a force, from the pair of welding electrodes to the sheet combination, thereby joining together the at least two overlapping steel sheets, wherein at least one of the steel sheets in the sheet combination is a high strength steel sheet that has a chemical composition containing, in mass %, C: 0.05 to 0.60% and Mn: 1.5 to 6.0% and has a tensile strength of 780 MPa or greater, the applying of the current includes a main current application step and a tempering post-heat treatment step, the main current application step including applying a current at a current value $I_w$ (kA), the tempering post-heat treatment step includes a cooling process and a heating process and includes at least one of a transition process and a holding process, in the cooling process, a cooling time $t_{ct}$ (ms), shown in formula (1) below, is provided, in the heating process, a current is applied at a current value $I_t$ (kA), shown in formula (2) below, for a current application time $t_t$ (ms), shown in formula (3) below, in the transition process, a current to be applied is continuously reduced from the current value $I_t$ (kA) to a current value $I_{tm}$ (kA), shown in formula (5) below, for a down-slope current application time $t_{tma}$ (ms), shown in formula (4) below, and in the holding process, a current is applied to a weld at the current value $I_{tm}$ (kA), shown in formula (5) below, for a current application time $t_{tm}$ (ms), shown in formula (6) below, $$800 \leq t_{ct} \tag{1}$$

$$0.8 \times I_w \leq I_t \leq 1.6 \times I_w \tag{2}$$

$$0 < t_t \leq 200 \tag{3}$$

$$0 < t_{tma} \leq 400 \tag{4}$$

$$0 \leq I_{tm} \leq 0.90 \times I_t \tag{5}$$

$$400 \leq t_t + t_{tma} + t_{tm} \tag{6}$$

where, in an instance in which the transition process is not included, $t_{tma}$ in formula (4) and formula (6) is 0 ms, and in an instance in which the holding process is not included, $I_{tm}$ in formula (5) is 0 kA, and $t_{tm}$ in formula (6) is 0 ms.

[2] The resistance spot welding method according to [1], wherein the chemical composition of the high strength steel sheet additionally contains, in mass %, one or two selected from a group A and a group B, where the group A includes Si: 0.1 to 2.0% and P: 0.10% or less, and the group B includes one or more selected from Cu, Ni, Mo, Cr, Nb, V, Ti, B, Al, and Ca, and a total content of the group B is less than or equal to 5%.

[3] A method for manufacturing a resistance spot welded joint, the method including manufacturing the resistance spot welded joint by using the resistance spot welding method according to [1] or [2].

Advantageous Effects

According to at least some disclosed embodiments, a resistance spot welding method is a method to be implemented on a sheet combination including a plurality of overlapping steel sheets that include at least one high strength steel sheet, and in this method, a hard structure in the nugget edge and the HAZ around the nugget, which is a structure resulting from cooling, is tempered. As a result, the toughness of the resistance spot weld including a high strength steel sheet is improved. Consequently, the joint strength of a resistance spot welded joint is improved, and, therefore, a remarkable industrial effect is produced.

DETAILED DESCRIPTION

Now, a resistance spot welding method and a method for manufacturing a resistance spot welded joint will be described with reference to the drawings. Note that the present invention is not limited to the described embodiments.

First, the resistance spot welding method according to one embodiment will be described.

Figure 1:
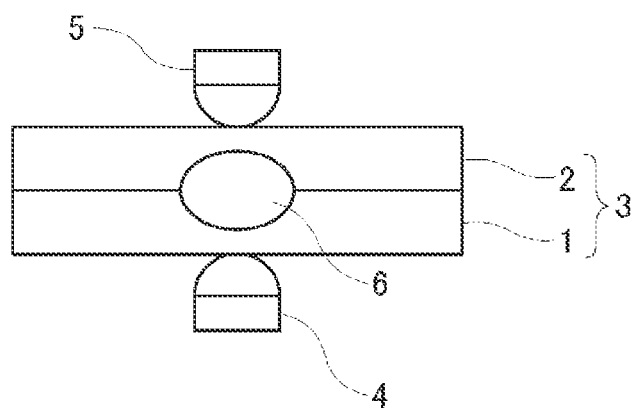
FIG. 1 is a schematic cross-sectional view illustrating resistance spot welding according to an embodiment.

A method according to one embodiment is described herein including preparing a sheet combination including a total of at least two overlapping steel sheets, which include at least one high strength steel sheet, and performing resistance spot welding to join the steel sheets together, by using any of the current application patterns that will be described later. FIG. 1 illustrates an example in which the resistance spot welding is performed on two steel sheets. Now, with reference to FIG. 1, the example in which two overlapping steel sheets are joined together will be described.

As illustrated in FIG. 1, a sheet combination 3 is first prepared by placing a steel sheet 2, which is positioned on an upper side, on top of a steel sheet 1, which is positioned on a lower side. In the example illustrated in FIG. 1, at least one of the steel sheets 1 and 2 is a high strength steel sheet.

Next, the sheet combination 3 is held between a welding electrode 4 and a welding electrode 5 (a pair of welding electrodes). The welding electrode 4 is positioned below the sheet combination 3, and the welding electrode 5 is positioned above the sheet combination 3. Then, a current, together with a force, is applied from the welding electrodes 4 and 5 to the sheet combination 3. Accordingly, a nugget 6, which has a required size, is formed to provide a resistance spot welded joint (which may hereinafter also be referred to as a "welded joint"). Note that in some embodiments, the sheet combination 3 may include three or more overlapping steel sheets, and in such instances, too, a welded joint can be obtained in a manner similar to that of the described welding method.

A suitable welding machine for performing the resistance spot welding method may be any welding machine, particularly a welding machine that includes a pair of upper and lower welding electrodes, can hold a welding target portion between the pair of welding electrodes to apply a force and a current thereto, and further includes an clamping force controller and a welding current controller that can desirably control the clamping force and the welding current, respectively, during welding.

Note that there is no particular limitation on a clamping mechanism (e.g., an air cylinder or a servo motor), a current control mechanism (e.g., alternating current or direct current), a type (e.g., a stationary welding machine or a robotic gun), and the like. In addition, there is no particular limitation on the type of power source (single-phase alternating current, alternating current inverter, or direct current inverter) and the like. In addition, there is no particular limitation on a shape of the electrodes. The type of a tip of the electrodes can be, for example, a dome radius type (DR type), a radius type (R type), or a dome type (D type), as specified in JIS C 9304: 1999.

In embodiments, at least one steel sheet in the sheet combination is a high strength steel sheet having a C content and a Mn content within the following ranges: $0.05 \leq C \leq 0.60$ (mass %) and $1.5 \leq Mn \leq 6.0$ (mass %).

In the following description regarding a chemical composition, "%" used as a unit for the contents of components is "mass %".

C: 0.05 to 0.60%

C is an element that contributes to strengthening of steel. If a C content is less than 0.05%, a strength of the resulting steel is low, and, therefore, obtaining a steel sheet having a tensile strength of 780 MPa or greater is very difficult. On the other hand, if the C content is greater than 0.60%, the strength of the resulting steel sheet is high, but the steel sheet has an excessive amount of martensite, which is hard, and, therefore, has an increased number of microvoids. Furthermore, in instances where welding is performed, the nugget and the heat-affected zone (HAZ) around the nugget become excessively hard and thus embrittled, and, therefore, achieving improved cross tension strength (CTS) is difficult. Accordingly, the C content is specified to be 0.05 to 0.60%. Preferably, the C content is specified to be greater than or equal to 0.10%. Preferably, the C content is specified to be less than or equal to 0.40%, and more preferably, less than or equal to 0.30%.

Mn: 1.5 to 6.0%

If a Mn content is less than 1.5%, a high joint strength can be achieved even without providing cooling that lasts for a long time as in embodiments of the present disclosure. On the other hand, if the Mn content is greater than 6.0%, embrittlement or embrittlement-induced cracking of the weld noticeably occurs, and, therefore, achieving improved joint strength is difficult. Accordingly, the Mn content is specified to be 1.5% to 6.0%. Preferably, the Mn content is specified to be greater than or equal to 1.5% and less than or equal to 5.5%. More preferably, the Mn content is specified to be greater than or equal to 2.5% and less than or equal to 3.5%.

In some embodiments, the high strength steel sheet may contain Si and P in addition to C and Mn; a content of Si and a content of P may each be within the range described below, which allows for the described resistance spot welding methods to be effectively used.

Si: 0.1 to 2.0%

When the Si content is greater than or equal to 0.1%, Si effectively functions to strengthen the steel. On the other hand, if the Si content is greater than 2.0%, the steel is strengthened, but toughness may be adversely affected. Accordingly, the Si content is specified to be 0.1 to 2.0%. More preferably, the Si content is specified to be greater than or equal to 0.2%, even more preferably, greater than or equal to 0.5%, and still more preferably, greater than or equal to 0.7%. More preferably, the Si content is specified to be less than or equal to 1.9%, and even more preferably, less than or equal to 1.8%.

P: 0.10% or less

P is an incidental impurity. If the P content is greater than 0.10%, strong segregation occurs at the nugget edge of the weld, and, therefore, achieving improved joint strength is difficult. Accordingly, the P content is specified to be less than or equal to 0.10%. More preferably, the P content is specified to be less than or equal to 0.03%, and even more preferably, less than or equal to 0.02%.

Note that in some embodiments, one or more additional elements selected from Cu, Ni, Mo, Cr, Nb, V, Ti, B, Al, and Ca may be added as necessary.

Cu, Ni, and Mo are elements that can contribute to improving the strength of steel.

Cr is an element that can improve strength by improving hardenability. However, while Cr can improve hardenability, the presence of an excessive amount of Cr may degrade the toughness of the HAZ.

Nb and V are elements that can strengthen steel by controlling a microstructure through precipitation hardening.

Ti and B are elements that can strengthen steel by improving hardenability.

Al is an element that can control the microstructure by refining austenite grains.

Ca is an element that can contribute to improving formability of steel.

To produce these effects, one or more additional elements selected from Cu, Ni, Mo, Cr, Nb, V, Ti, B, Al, and Ca may be added to the chemical composition as necessary. If these elements are added in excessive amounts, toughness may be degraded, and/or cracking may occur. Accordingly, in instances where one or more of these elements are included, a permissible total content thereof is less than or equal to 5%. In instances where Cr is to be included, it is preferable that a Cr content be less than or equal to 1%, for the reason mentioned above.

Note that the remainder in the chemical composition is Fe and incidental impurities.

In embodiments, the high strength steel sheet having the above-described chemical composition has a tensile strength of 780 MPa or greater. As described above, when the base metal has a tensile strength of 980 MPa or greater, a low CTS may be exhibited. In addition, when the base metal has a tensile strength of 780 MPa or greater, too, a low CTS may be exhibited. However, according to disclosed embodiments, even in the instance where a high strength steel sheet having a tensile strength of 780 MPa or greater is used, a microstructure has toughness because tempered martensite is formed in the microstructure. Consequently, brittle fractures of the nugget edge are prevented. Accordingly, a decrease in CTS in the weld is inhibited.

The overlapping steel sheets may be a plurality of overlapping steel sheets of the same type or a plurality of overlapping steel sheets of different types. For example, the overlapping steel sheets may be a surface-treated steel sheet having a coated layer and a steel sheet having no coated layer.

Furthermore, the steel sheets may have the same sheet thickness or different sheet thicknesses. For example, since the steel sheets of concern are typical automotive steel sheets, it is preferable that the sheet thickness of the steel sheets be within a range of 0.4 mm to 2.3 mm.

Now, the current application patterns of the resistance spot welding method in some embodiments will be described.

In one embodiment, a main current application step is first performed, and subsequently, a tempering post-heat treatment step is performed. In the main current application step, a current is applied to the sheet combination under predetermined welding conditions to form a nugget. In the tempering post-heat treatment step, the nugget edge is tempered by applying a current under predetermined welding conditions. The tempering post-heat treatment step includes a cooling process and a heating process and includes at least one of a transition process and a holding process.

[Main Current Application Step]

The main current application step is a current application step for applying a current at a current value $I_w$ (kA) to an overlapping portion of the lower steel sheet 1 and the upper steel sheet 2 to melt the overlapping portion, thereby forming the nugget 6, as illustrated in the example of FIG. 1. There is no particular limitation on current application conditions and clamping conditions for forming the nugget 6 in the main current application step.

In instances where the overlapping steel sheets include a high strength steel sheet containing the above-described steel sheet components, it is preferable that the current application conditions for the main current application step be controlled as follows.

For example, preferably, the current value $I_w$ (kA) of the main current application step is specified to be 3.0 kA to 8.0 kA to obtain a consistent nugget diameter. The nugget diameter employed for the spot weld of automotive steel sheets is typically $3.0\sqrt{t}$ to $6.0\sqrt{t}$. If the current value is excessively low, the target nugget diameter cannot be obtained consistently. On the other hand, if the current value is excessively high, the resulting nugget diameter may be excessively large, or the degree of the melting of the steel sheets becomes excessively high, which may cause a molten weld to be expelled as expulsion from between the sheets, and, consequently, the resulting nugget diameter may be small.

Furthermore, preferably, a current application time $t_w$ (ms) of the main current application step is specified to be 120 ms to 400 ms. This is a time that contributes to, as with the current value $I_w$, obtaining the target nugget diameter. If the current application time $t_w$ is less than 120 ms, the nugget cannot be easily formed. On the other hand, if the current application time $t_w$ is greater than 400 ms, the resulting nugget diameter may be excessively large, and workability may be degraded. However, as long as a necessary nugget diameter can be obtained, the current application time may be less than or greater than those within the above-mentioned preferred range.

Regarding the clamping conditions, it is preferable that the clamping force be 2.0 kN to 7.0 kN. If the clamping force is excessively high, a current application diameter is enlarged, and, consequently, it is likely to be difficult to ensure a nugget diameter. On the other hand, if the clamping force is excessively low, the current application diameter is reduced, which increases the probability of expulsion. For these reasons, it is preferable that the clamping force be within the above-mentioned range. In some instances, the clamping force may be limited by machine capability. However, the clamping force may be less than or greater than those within the above-mentioned preferred range as long as the clamping force is sufficient to obtain a necessary nugget diameter.

[Tempering Post-Heat Treatment Step]

The tempering post-heat treatment step is a step of post-heat treatment for tempering the nugget edge (a hard structure in the nugget edge and the HAZ near the nugget edge) of the nugget 6, which is formed in the main current application step. To produce an effect of improving the toughness of the nugget edge, it is important to control the welding conditions of the tempering post-heat treatment step as follows.

Examples of the manners in which the tempering post-heat treatment step is carried out are as follows: the cooling process, the heating process, and the holding process may be performed in this order (see FIG. 2); the cooling process, the heating process, the transition process, and the holding process may be performed in this order (see FIG. 3); and the cooling process, the heating process, and the transition process may be performed in this order (see FIG. 4). With any of the patterns for the tempering post-heat treatment step, the above-described advantageous effects can be produced.

<Cooling Process>

After the main current application step, cooling is performed to cool the nugget edge to a temperature at which martensitic transformation occurs in the nugget edge. In this cooling process, the weld is cooled for a cooling time $t_{ct}$ (ms), shown in formula (1), so as to sufficiently produce an effect of tempering, which will be described later.

$$800 \leq t_{ct} \quad (1)$$

If the cooling time $t_{ct}$ (ms) is less than 800 (ms), sufficient martensitic transformation does not occur in the nugget edge, which results in an absence of martensite, with austenite remaining in the microstructure. Accordingly, the austenite remains as it is in the tempering post-heat treatment step and eventually forms a martensite structure. Consequently, the nugget edge has a brittle microstructure, and, therefore, CTS is not improved. Accordingly, the cooling time $t_{ct}$ (ms) is specified to be greater than or equal to 800 (ms). Preferably, the cooling time $t_{ct}$ (ms) is specified to be greater than or equal to 850 (ms), more preferably, greater than or equal to 900 (ms), and even more preferably, greater than or equal to 950 (ms).

The upper limit of the cooling time $t_{ct}$ (ms) of the cooling process is not particularly limited. The steel sheets in some embodiments are automotive steel sheets. Since a long welding time reduces operational efficiency, it is preferable that the cooling time $t_{ct}$ (ms) be less than or equal to 2200 (ms). More preferably, the cooling time $t_{ct}$ (ms) is specified to be less than or equal to 2000 (ms), and even more preferably, less than or equal to 1800 (ms).

<Heating Process>

After the cooling process, the heating process is performed, which is a process for applying a current to the weld at a current value $I_t$ (kA) for postheating, shown in formula (2), for a current application time $t_t$ (ms), shown in formula (3).

$$0.8 \times I_w \leq I_t \leq 1.6 \times I_w \quad (2)$$

$$0 < t_t \leq 200 \quad (3)$$

Usually, even if a constant current value for postheating is set for performing a current application, a temperature of the nugget edge increases with an increase in the current application time in postheating, that is, tempering in a target temperature range lasts only temporarily. Accordingly, in some embodiments, the current of the first current application in the postheating (current application of the heating process) is increased, thereby rapidly heating the weld in a short time to a temperature immediately below an $A_1$ temperature. Consequently, the hard portion (hard structure) in the nugget edge is effectively tempered. As a result, tempered martensite is formed in the microstructure of the nugget edge. If the current value $I_t$ is excessively low, the effect of tempering is weak. On the other hand, if the current value $I_t$ is excessively high, the temperature exceeds the $A_1$ temperature, and, therefore, the effect of tempering is lost.

For these reasons, if the current value $I_t$ (kA) of the heating process is less than $(0.8 \times I_w)$, the temperature reached is less than the $A_1$ temperature, and, consequently, the nugget edge cannot be effectively tempered. Accordingly, the current value $I_t$ (kA) of the heating process is specified to be greater than or equal to $(0.8 \times I_w)$. Preferably, the current value $I_t$ (kA) is specified to be greater than or equal to $(1.0 \times I_w)$, and more preferably, greater than or equal to $(1.05 \times I_w)$.

On the other hand, if the current value $I_t$ (kA) of the heating process is greater than $(1.6 \times I_w)$, the temperature reached is likely to be greater than the $A_1$ temperature; consequently, in a subsequent process, austenitic transformation occurs again, and eventually, a martensite structure is formed, which causes embrittlement. As a result, toughness of the nugget edge is not achieved. Accordingly, the current value $I_t$ (kA) of the heating process is specified to be less than or equal to $(1.6 \times I_w)$. Preferably, the current value $I_t$ (kA) is specified to be less than or equal to $(1.4 \times I_w)$, and more preferably, less than or equal to $(1.3 \times I_w)$.

In the heating process of the tempering post-heat treatment step, the temperature is generally rapidly increased in a short time. Accordingly, the current application time $t_t$ (ms) of the heating process is specified to be $0 < t_t \leq 200$.

If the current application time (heating time) $t_t$ of the heating process is 0 ms, the tempering of the nugget edge is not sufficient, and the effect of heating is weak. Accordingly, the heating time $t_t$ is specified to be greater than 0 ms. Preferably, the heating time $t_t$ is specified to be greater than or equal to 10 ms, more preferably greater than or equal to 20 ms, even more preferably greater than or equal to 40 ms, and still more preferably greater than or equal to 80 ms.

On the other hand, if the heating time $t_t$ is excessively long, the temperature of the nugget edge excessively increases and becomes greater than the $A_1$ temperature. As a result, the tempered martensite becomes an austenite structure again and returns to hard martensite after completion of the current application for tempering. As a result, the effect of tempering is lost. Accordingly, the heating time $t_t$ is specified to be less than or equal to 200 ms. In instances where the temperature can be increased to a temperature immediately below the $A_1$ temperature in the heating process, the temperature can be maintained in the transition process and the holding process, which are processes that follow. Accordingly, the heating time $t_t$ is preferably specified to be less than or equal to 160 ms and more preferably less than or equal to 150 ms, from the standpoint of shortening the welding time for productivity.

<Transition Process>

In instances where the transition process is included, the transition process is performed after the heating process. In the transition process, a current is applied to the weld for a down-slope current application time $t_{tma}$ (ms), shown in formula (4).

$$0 < t_{tma} \leq 400 \quad (4)$$

In instances where the transition process is not included, $t_{tma}$ in formula (4) is 0 ms. That is, in instances where the transition process is not included, the down-slope current application time $t_{tma}$ is not provided, that is, formula (4) is not used.

Figure 3:
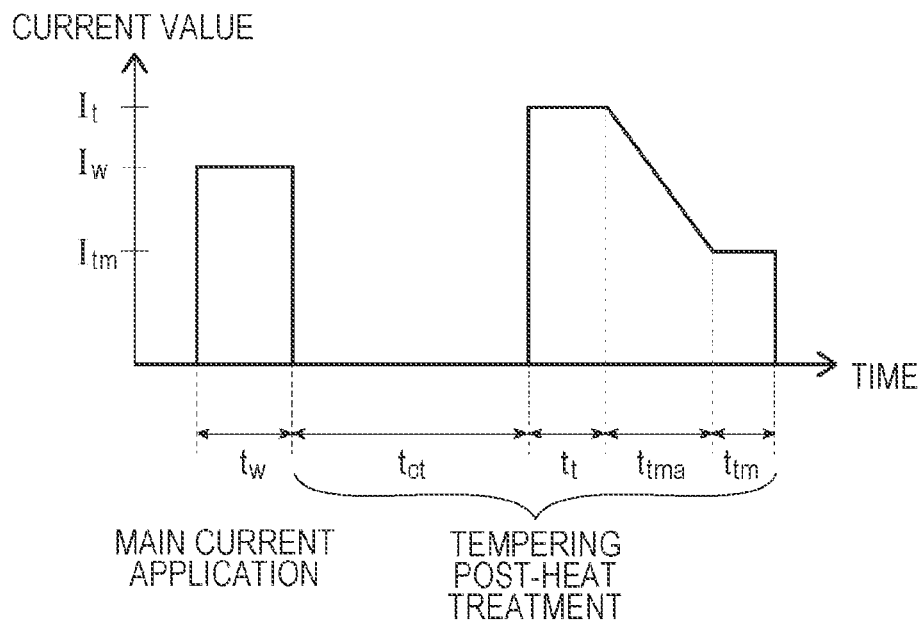
FIG. 3 is a graph illustrating an example of a current application pattern according to another embodiment of the resistance spot welding method.
Figure 4:
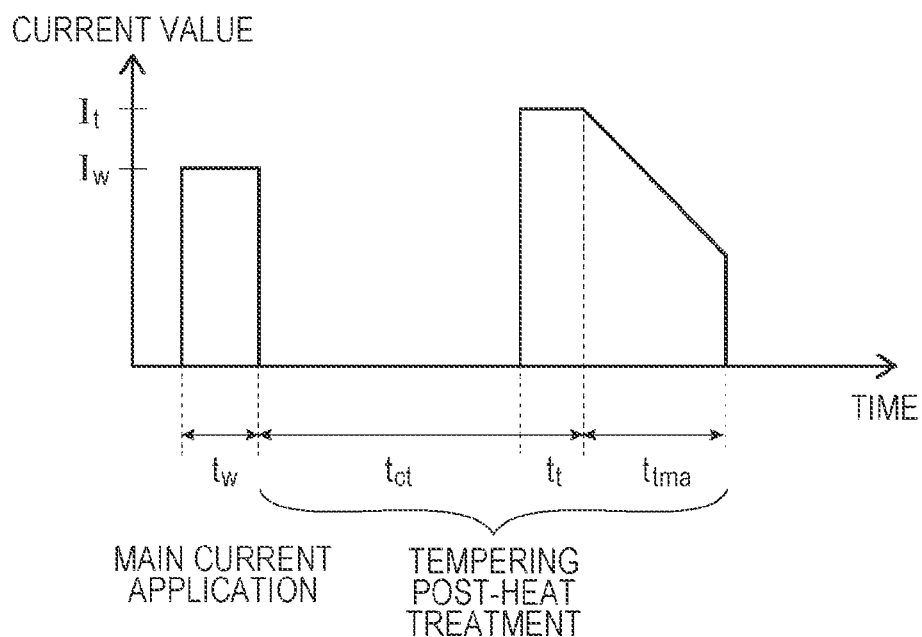
FIG. 4 is a graph illustrating an example of a current application pattern according to yet another embodiment of the resistance spot welding method.

The transition process is added in instances where both the transition process and the holding process that follow the heating process are included (i.e., in instances where the transition process to be performed between the heating process and the holding process, which will be described later, is included), as illustrated in FIG. 3, and in instances where only the transition process that follows the heating process is included, as illustrated in FIG. 4. In the transition process, the current is continuously changed from the current value $I_t$ (kA) of the heating process to a current value $I_{tm}$ (kA) of the holding process, shown in formula (5), which will be described later, over a predetermined period of transition time. Accordingly, the nugget edge can be controlled to have a temperature immediately below the $A_1$ temperature. A purpose of the transition process is to perform control such that the nugget edge has a temperature immediately below the $A_1$ temperature, and the effect can be produced even when the down-slope current application time (transition time) $t_{tma}$ of the transition process is a short time. Accordingly, in instances where the transition process is included, the transition time is specified to be greater than 0 and less than or equal to 400 ms because a long welding time results in a reduction in operational efficiency. Preferably, the transition time is specified to be greater than or equal to 20 ms, and more preferably, greater than or equal to 30 ms. Preferably, the transition time is specified to be less than or equal to 350 ms, and more preferably, less than or equal to 300 ms.

Note that in some embodiments, the heating process described above may be replaced by the transition process. In this instance, the transition process may be performed after the cooling process. Specifically, first, a current may be applied at a high current value ($I_t$) as shown in formula (2) above, and thereafter, the current is continuously changed from the current value $I_t$ to a current value $I_{tm}$ of the holding process, shown in formula (5), which will be described later, for the down-slope current application time $t_{tma}$ (ms) shown in formula (4) above.

<Holding Process>

Figure 2:
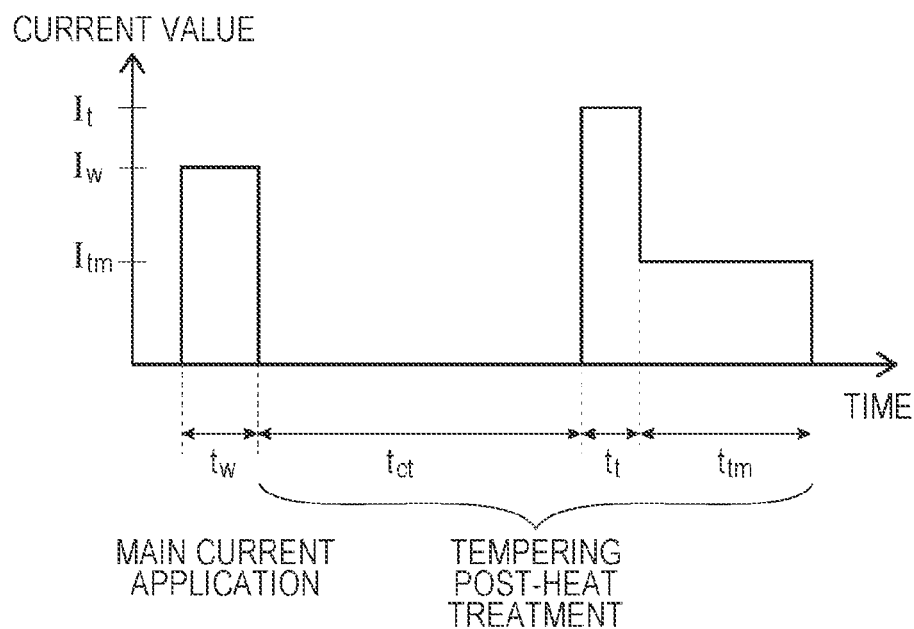
FIG. 2 is a graph illustrating an example of a current application pattern according to an embodiment of a resistance spot welding method.

The holding process is provided in instances where the holding process that follows the heating process is included, as illustrated in FIG. 2, and in instances where the transition process and the holding process that follow the heating process are included, as illustrated in FIG. 3. In the holding process, a current is applied to the weld at the current value $I_{tm}$ (kA) shown in formula (5) for a current application time $t_{tm}$ (ms), shown in formula (6).

$$0 \le I_{tm} \le 0.90 \times I_t \quad (5)$$

$$400 \le t_t + t_{tma} + t_{tm} \quad (6)$$

In instances where the transition process is not included, $t_{tma}$ in formula (6) is 0 ms. In instances where the holding process is not included, $I_{tm}$ in formula (5) is 0 kA, and $t_{tm}$ in formula (6) is 0 ms.

Accordingly, the nugget edge can be tempered while a temperature immediately below the $A_1$ temperature achieved in the heating process is maintained; in this manner, tempering can be allowed to proceed. As a result, the effect of tempering can be produced more effectively. The holding process is a process for maintaining the temperature immediately below the $A_1$ temperature reached in the heating process, and, therefore, the specified current value $I_{tm}$ of the holding process is lower than the current value $I_t$ of the heating process. Furthermore, if the current value $I_{tm}$ is excessively high, the temperature may exceed the $A_1$ temperature during the holding, and, therefore, the current value $I_{tm}$ (kA) is specified to be less than or equal to $(0.90 \times I_t)$ kA. Preferably, the current value $I_{tm}$ (kA) is specified to be less than or equal to $(0.8 \times I_t)$ kA, and more preferably, less than or equal to $(0.7 \times I_t)$ kA. The current value $I_{tm}$ of the holding process is specified to be greater than or equal to 0 kA. Preferably, the current value $I_{tm}$ is specified to be greater than or equal to $(0.4 \times I_t)$ kA, and more preferably, greater than or equal to $(0.45 \times I_t)$ kA.

Note that, even in instances where the transition process that follows the heating process is not included, and only the holding process is included, as illustrated in FIG. 2, the temperature immediately below the $A_1$ temperature can be maintained, as described above.

Preferably, the current application time $t_{tm}$ (ms) of the holding process is specified to be greater than or equal to 50 ms and less than or equal to 2000 ms, from the standpoint of ensuring the temperature of the nugget edge is maintained immediately below the $A_1$ temperature, thereby allowing the tempering to proceed.

More preferably, the current application time $t_{tm}$ (ms) of the holding process is specified to be greater than or equal to 400 ms and less than or equal to 1800 ms. Even more preferably, the current application time $t_{tm}$ (ms) is specified to be greater than or equal to 600 ms and less than or equal to 1600 ms.

In embodiments, the current application time (ms) of the tempering post-heat treatment step is controlled, that is, the total of the current application time $t_t$ (ms) of the heating process, the current application time $t_{tma}$ of the transition process, and the current application time $t_{tm}$ of the holding process. The total of the current application times of the tempering post-heat treatment step satisfies the relationship of formula (6), shown above. In this instance, the current application time $t_{tm}$ of the holding process is controlled such that formula (6) shown above is satisfied.

If the total of the right-hand side of formula (6) is less than 400 ms, tempering does not proceed, and, therefore, the joint strength is not improved. Accordingly, the current application time of the tempering post-heat treatment step is specified to be greater than or equal to 400 ms. The current application time is preferably greater than or equal to 450 ms, more preferably greater than or equal to 500 ms, and even more preferably greater than or equal to 800 ms, so that a better effect of the tempering can be produced. Note that the upper limit of the current application time of the tempering post-heat treatment step is not particularly limited. It is preferable that the current application time of the tempering post-heat treatment step be less than or equal to 2000 ms, because if the current application time of the tempering post-heat treatment step is excessively long, productivity is impaired. More preferably, the current application time of the tempering post-heat treatment step is specified to be less than or equal to 1500 ms, and even more preferably less than or equal to 1200 ms.

Now, the method for manufacturing a resistance spot welded joint will be described.

This disclosure relates to the method for manufacturing a resistance spot welded joint, and the method uses the resistance spot welding method described above. For example, the method for manufacturing a resistance spot welded joint is carried out as follows. The resistance spot welding is performed, in which a sheet combination including at least two overlapping steel sheets is held between a pair of welding electrodes, and then, a current, together with a force, is applied from the welding electrodes to the sheet combination under the welding conditions of each of the above-described steps. In this manner, a nugget having a required size is formed to provide a resistance spot welded joint. Note that the steel sheets, the welding conditions, and the like are similar to those described above, and, therefore, descriptions thereof are omitted.

As described above, the resistance spot welding method and the method for manufacturing a resistance spot welded joint, according to embodiments, appropriately control the welding conditions of the postheating, that is, the tempering post-heat treatment step, thereby improving the toughness of the nugget edge to give a ductile fracture surface and, therefore, inhibit an interfacial fracture. As a result, a fracture that can occur can be a plug fracture or a partial plug fracture in which most of the plug remains. Consequently, the resulting welded joint has improved joint strength (CTS).

Furthermore, the improved toughness of the nugget edge results in a further improved TSS of the welded joint. Accordingly, even in the instance where the sheet combination includes a high strength steel sheet containing the above-described steel sheet components, the joint strengths (CTS and TSS) are further improved.

Note that the nugget produced by the described methods can have contents of components within the following ranges: $0.05 \leq C \leq 0.60$ (mass %); $0.1 \leq Si \leq 2.0$ (mass %); and $1.5 \leq Mn \leq 6.0$ (mass %). A method for calculating the contents of the components of the nugget may be as follows: a sample is prepared by using the above-described method, a nugget is cut therefrom, and chemical analysis is performed thereon. Another method may be as follows: a cross-sectional photograph of the weld is obtained, and the contents are calculated from the ratios of cross-sectional areas of the melted portions of the respective upper and lower steel sheets and the contents of each of the steel sheet components thereof.

EXAMPLES

Functions and effects of embodiments of the invention will now be described with reference to examples. Note that the present invention is not limited to the examples described below.

In the following Examples, resistance spot welding was performed on each of sheet combinations 3 including two overlapping steel sheets (a lower steel sheet 1 and an upper steel sheet 2) as illustrated in FIG. 1, described above, by using a resistance welding device attached to a C gun. The resistance welding device was of a servo-motor-clamping type and included a DC power supply. A nugget 6 having a required size was formed, and, accordingly, a resistance spot welded joint was prepared. Note that some of the sheet combinations included three overlapping steel sheets.

Steel sheets used in test specimens were steel sheets of 780 MPa to 1180 MPa classes with sheet thicknesses of 0.8 to 1.2 mm (steel sheets A to J) as shown in Tables 1 and 2.

The test specimens had a size of 150 mm (long side) and 50 mm (short side). Steel sheets A to J were steel sheets having the chemical composition shown in Table 1. "%" used in the context of steel sheet components is "mass %" unless otherwise specified.

First, the sheet combinations 3 were each prepared by positioning the obtained test specimens in an overlapping manner as shown in Table 2.

Next, resistance spot welding was performed on each of the sheet combinations 3 under the welding conditions shown in Table 3-1 or 3-2 to form the nugget 6 having a required size. Accordingly, resistance spot welded joints were obtained.

Note that in this instance, the current application was performed under the following conditions. The clamping force during current application was a constant clamping force of 3.5 kN. The lower welding electrode 4 and the upper welding electrode 5 were both a DR-type electrode made of a copper-chromium alloy, with a tip diameter of 6 mm and a tip curvature radius of 40 mm. For the welding operation, the clamping force was controlled with the lower welding electrode 4 and the upper welding electrode 5, and a DC power source was used. The nugget diameter was less than or equal to $5.5\sqrt{t}$ (mm), where t is a sheet thickness (mm).

A cross tension test and a tensile shear test were conducted on the obtained resistance spot welded joints by using the methods described below, and evaluations of CTS and TSS were performed.

[Evaluation of CTS]

The evaluation of CTS was performed by measuring the CTS (cross tension strength) of the prepared resistance spot welded joints by conducting a cross tension test thereon in accordance with the method specified in JIS Z 3137. Welded joints that had a measured value equal to or greater than that of JIS class A (3.4 kN) are denoted by a symbol of "○", and welded joints that had a measured value less than that of JIS class A are denoted by a symbol of "x". Note that in the present examples, instances with the symbol of "○" were determined to be "good", and instances with the symbol of "x" were determined to be "poor".

[Evaluation of TSS]

The evaluation of TSS was performed by measuring the TSS (tensile strength in a shear direction) of the prepared resistance spot welded joints by conducting a tensile shear test thereon in accordance with the method specified in JIS Z 3136. Welded joints that had a measured value equal to or greater than that of JIS class A (6.4 kN) are denoted by a symbol of "○", and welded joints that had a measured value less than that of JIS class A are denoted by a symbol of "x". Note that in the present examples, instances with the symbol of "○" were determined to be "good", and instances with the symbol of "x" were determined to be "poor".

Tables 4-1 and 4-2 show the results of the evaluation of CTS and TSS of the resistance spot welded joints.

TABLE 1

| Steel sheet | Chemical composition (mass %) | | | | | | | | | | | | | | Notes |
|---|---|---|---|---|---|---|---|---|---|---|---|---|---|---|---|
| | C | Si | Mn | P | Cu | Ni | Mo | Cr | Nb | V | Ti | B | Al | Ca | |
| A | 0.20 | 0.6 | 4.0 | 0.01 | — | — | — | — | — | — | — | — | — | — | Steel sheet A |
| B | 0.10 | 0.2 | 6.0 | 0.01 | — | — | — | 0.40 | — | — | — | — | — | — | Steel sheet B |
| C | 0.20 | 1.1 | 2.0 | 0.01 | — | — | — | — | 0.05 | — | — | — | — | 0.005 | Steel sheet C |
| D | 0.13 | 0.8 | 3.5 | 0.01 | 0.20 | 0.30 | — | — | — | — | — | — | 0.03 | — | Steel sheet D |

TABLE 1-continued

| Steel sheet | Chemical composition (mass %) | | | | | | | | | | | | | | Notes |
|---|---|---|---|---|---|---|---|---|---|---|---|---|---|---|---|
| | C | Si | Mn | P | Cu | Ni | Mo | Cr | Nb | V | Ti | B | Al | Ca | |
| E | 0.58 | 0.25 | 1.5 | 0.03 | — | — | — | — | — | — | — | — | — | — | Steel sheet E |
| F | 0.30 | 1.9 | 2.5 | 0.01 | — | — | — | — | — | — | 0.03 | 0.002 | — | — | Steel sheet F |
| G | 0.60 | 1.5 | 1.5 | 0.01 | — | — | 0.20 | — | — | — | — | — | — | — | Steel sheet G |
| H | 0.40 | 1.2 | 2.0 | 0.01 | — | — | — | — | 0.05 | — | — | — | — | — | Steel sheet H |
| I | 0.65 | 2.0 | 1.5 | 0.01 | — | — | — | — | — | — | — | — | — | — | Comparative steel I |
| J | 0.40 | 0.5 | 6.5 | 0.01 | — | — | — | — | — | — | — | — | — | — | Comparative steel J |

TABLE 2

| Sheet combination | Positions of overlapping steel sheets | Type of steel sheet | Tensile strength | Sheet thickness of steel sheet |
|---|---|---|---|---|
| a | First sheet | Steel sheet A | 1180 MPa | 1.2 mm |
| | Second sheet | Steel sheet A | 1180 MPa | 1.2 mm |
| b | First sheet | Steel sheet B | 1180 MPa | 1.2 mm |
| | Second sheet | Steel sheet B | 1180 MPa | 1.2 mm |
| c | First sheet | Steel sheet A | 1180 MPa | 1.2 mm |
| | Second sheet | Steel sheet B | 1180 MPa | 1.2 mm |
| d | First sheet | Steel sheet A | 1180 MPa | 1.2 mm |
| | Second sheet | Steel sheet C | 980 MPa | 1.2 mm |
| e | First sheet | Steel sheet A | 1180 MPa | 1.2 mm |
| | Second sheet | Steel sheet D | 780 MPa | 1.2 mm |
| f | First sheet | Steel sheet E | 1180 MPa | 1.2 mm |
| | Second sheet | Steel sheet E | 1180 MPa | 1.2 mm |
| g | First sheet | Steel sheet F | 1180 MPa | 1.2 mm |
| | Second sheet | Steel sheet F | 1180 MPa | 1.2 mm |
| h | First sheet | Steel sheet G | 1180 MPa | 1.2 mm |
| | Second sheet | Steel sheet G | 1180 MPa | 1.2 mm |
| i | First sheet | Steel sheet H | 1180 MPa | 1.2 mm |
| | Second sheet | Steel sheet H | 1180 MPa | 1.2 mm |
| j | First sheet | Comparative steel I | 1180 MPa | 1.2 mm |
| | Second sheet | Comparative steel I | 1180 MPa | 1.2 mm |
| k | First sheet | Steel sheet B | 1180 MPa | 1.2 mm |
| | Second sheet | Comparative steel I | 1180 MPa | 1.2 mm |
| l | First sheet | Steel sheet C | 1180 MPa | 1.2 mm |
| | Second sheet | Comparative steel J | 1180 MPa | 1.2 mm |
| m | First sheet | Steel sheet A | 1180 MPa | 0.8 mm |
| | Second sheet | Steel sheet A | 1180 MPa | 0.8 mm |
| | Third sheet | Steel sheet A | 1180 MPa | 0.8 mm |

TABLE 3-1

| | | Tempering post-heat treatment step | | | | | | | | |
|---|---|---|---|---|---|---|---|---|---|---|
| | | Main current application step | | Cooling process | Heating process | | Transition process Down-slope | Holding process | | |
| Welding No. | Sheet combination | Current value $I_w$ (kA) | Current application time $t_w$ (ms) | Cooling time $t_{ct}$ (ms) | Current value $I_t$ (kA) | Current application time $t_t$ (ms) | current application time $t_{tma}$ (ms) | Current value $I_{tn}$ (kA) | Current application time $t_{tn}$ (ms) | $t_t + t_{tma} + t_{tn}$ | $A_1$ temperature (° C.) |
| 1 | a | 6.5 | 280 | — | — | — | — | — | — | 0 | 710 |
| 2 | a | 6.5 | 280 | 1200 | 7.0 | 60 | — | 4.5 | 1200 | 1260 | 710 |
| 3 | a | 6.5 | 280 | 740 | 7.5 | 40 | — | 4.5 | 1600 | 1640 | 710 |
| 4 | a | 6.5 | 280 | 1500 | 6.8 | 40 | 20 | 4.5 | 600 | 660 | 710 |
| 5 | a | 6.5 | 280 | 1400 | 7.0 | 60 | 10 | 4.0 | 900 | 970 | 710 |
| 6 | a | 6.5 | 250 | 1100 | 7.0 | 60 | — | 6.5 | 900 | 960 | 710 |
| 7 | a | 6.5 | 250 | 900 | 8.0 | 100 | — | 4.0 | 450 | 550 | 710 |
| 8 | a | 6.7 | 250 | 860 | 11.0 | 60 | 20 | 4.5 | 1600 | 1680 | 710 |
| 9 | a | 6.7 | 280 | 1600 | 6.7 | 10 | 380 | 1.0 | 1000 | 1390 | 710 |
| 10 | a | 6.7 | 280 | 1000 | 6.7 | 300 | — | 5.0 | 1000 | 1300 | 710 |
| 11 | b | 6.5 | 280 | 900 | 4.8 | 60 | — | 4.0 | 900 | 960 | 682 |
| 12 | b | 6.5 | 280 | 1800 | 7.0 | 20 | 30 | 4.0 | 1500 | 1550 | 682 |
| 13 | b | 6.5 | 280 | 1000 | 7.8 | 150 | — | 4.5 | 600 | 750 | 682 |
| 14 | b | 6.7 | 300 | 1400 | 6.3 | 20 | 10 | 4.0 | 1500 | 1530 | 682 |
| 15 | c | 6.5 | 280 | 1600 | 6.5 | 40 | 20 | 6.1 | 1100 | 1160 | 695 |
| 16 | c | 6.5 | 280 | 1000 | 6.8 | 40 | 10 | 3.8 | 300 | 350 | 695 |
| 17 | c | 6.5 | 280 | 800 | 7.5 | 120 | — | 4.4 | 500 | 620 | 695 |
| 18 | d | 6.5 | 280 | 820 | 5.2 | 40 | — | 3.5 | 1600 | 1640 | 725 |
| 19 | d | 6.5 | 280 | 1600 | 6.0 | 100 | — | 4.5 | 400 | 500 | 725 |
| 20 | d | 6.5 | 280 | 1600 | 7.5 | 200 | — | 5.0 | 500 | 700 | 725 |
| 21 | d | 6.5 | 280 | 1000 | 12.0 | 60 | 20 | 6.5 | 400 | 480 | 725 |
| 22 | e | 6.5 | 280 | 1600 | 6.5 | 10 | 20 | 3.0 | 1000 | 1030 | 715 |
| 23 | e | 6.5 | 280 | 2000 | 10.0 | 40 | — | 4.0 | 1000 | 1040 | 715 |

TABLE 3-2

| | | Main current application step | | Cooling | Heating process | | Transition process Down-slope | Holding process | | | |
|---|---|---|---|---|---|---|---|---|---|---|---|
| Welding No. | Sheet combination | Current value $l_w$ (kA) | Current application time $t_w$ (ms) | process Cooling time $t_{ct}$ (ms) | Current value $l_t$ (kA) | Current application time $t_t$ (ms) | current application time $t_{tma}$ (ms) | Current value $l_{tm}$ (kA) | Current application time $t_{tm}$ (ms) | $t_t + t_{tma} + t_{tm}$ | $A_1$ temperature (° C.) |
| 24 | e | 6.5 | 280 | 1000 | 6.7 | 40 | 10 | 4.0 | 500 | 550 | 715 |
| 25 | e | 6.3 | 300 | 1000 | 7.6 | 100 | — | 2.0 | 1600 | 1700 | 715 |
| 26 | f | 6.5 | 280 | 1800 | 7.0 | 40 | — | 4.0 | 1800 | 1840 | 722 |
| 27 | f | 6.5 | 280 | 1600 | 6.8 | 40 | 40 | 4.5 | 2000 | 2080 | 722 |
| 28 | f | 6.5 | 280 | 1600 | 4.8 | 40 | — | 4.5 | 1200 | 1240 | 722 |
| 29 | g | 6.5 | 280 | 1600 | 6.5 | 40 | — | 4.0 | 1200 | 1240 | 775 |
| 30 | g | 6.7 | 250 | 1800 | 7.0 | 40 | 30 | 4.2 | 1300 | 1370 | 775 |
| 31 | g | 6.5 | 280 | 900 | 7.5 | 200 | — | 4.8 | 900 | 1100 | 775 |
| 32 | h | 6.5 | 280 | 2000 | 8.5 | 150 | — | 4.5 | 1800 | 1950 | 752 |
| 33 | h | 6.5 | 280 | 2200 | 7.8 | 200 | — | 4.8 | 1600 | 1800 | 752 |
| 34 | h | 6.5 | 280 | 1000 | 7.0 | 200 | — | 7.0 | 1000 | 1200 | 752 |
| 35 | i | 6.5 | 280 | 1400 | 6.8 | 40 | 30 | 4.0 | 300 | 370 | 752 |
| 36 | i | 6.5 | 280 | 1000 | 7.5 | 150 | 30 | 4.0 | 500 | 680 | 752 |
| 37 | i | 6.5 | 280 | 500 | 7.5 | 150 | 100 | 4.5 | 300 | 550 | 753 |
| 38 | j | 6.5 | 280 | 1000 | 7.0 | 40 | 100 | 4.0 | 1000 | 1140 | 752 |
| 39 | j | 6.5 | 280 | 2000 | 8.0 | 120 | — | 5.0 | 1500 | 1620 | 752 |
| 40 | k | 6.5 | 280 | 1000 | 8.0 | 180 | — | 5.0 | 1600 | 1780 | 725 |
| 41 | k | 6.5 | 280 | 2000 | 7.5 | 100 | — | 4.5 | 1200 | 1300 | 725 |
| 42 | l | 6.5 | 280 | 900 | 8.0 | 100 | 100 | 5.3 | 600 | 800 | 725 |
| 43 | l | 6.5 | 280 | 1200 | 7.0 | 200 | — | 6.2 | 1000 | 1200 | 725 |
| 44 | m | 6.5 | 300 | 1800 | 7.0 | 60 | 60 | 4.0 | 1500 | 1620 | 710 |
| 45 | m | 6.5 | 280 | 1600 | 6.8 | 40 | — | 4.5 | 1300 | 1340 | 710 |
| 46 | m | 6.7 | 300 | 1600 | 6.0 | 40 | 10 | 4.0 | 1000 | 1050 | 710 |
| 47 | m | 6.7 | 300 | 1600 | 7.5 | 50 | 380 | 3.0 | — | 430 | 710 |

TABLE 4-1

| | Evaluation results | | | | |
|---|---|---|---|---|---|
| Welding No. | CTS (kN) | CTS rating [*1] | TSS (kN) | TSS rating [*2] | Notes |
| 1 | 3.0 | x | 12.4 | ○ | Comparative Example |
| 2 | 5.9 | ○ | 19.5 | ○ | Invention Example |
| 3 | 3.1 | x | 12.6 | ○ | Comparative Example |
| 4 | 4.2 | ○ | 16.4 | ○ | Invention Example |
| 5 | 4.5 | ○ | 17.3 | ○ | Invention Example |
| 6 | 2.9 | x | 12.3 | ○ | Comparative Example |
| 7 | 5.2 | ○ | 17.4 | ○ | Invention Example |
| 8 | 2.8 | x | 12.0 | ○ | Comparative Example |
| 9 | 5.1 | ○ | 16.7 | ○ | Invention Example |
| 10 | 2.8 | x | 12.1 | ○ | Comparative Example |
| 11 | 3.3 | x | 12.0 | ○ | Comparative Example |
| 12 | 5.2 | ○ | 15.3 | ○ | Invention Example |
| 13 | 5.8 | ○ | 16.0 | ○ | Invention Example |
| 14 | 4.8 | ○ | 14.1 | ○ | Invention Example |
| 15 | 3.2 | x | 7.5 | ○ | Comparative Example |
| 16 | 3.1 | x | 8.2 | ○ | Comparative Example |
| 17 | 4.8 | ○ | 14.5 | ○ | Invention Example |
| 18 | 6.2 | ○ | 25.1 | ○ | Invention Example |
| 19 | 7.4 | ○ | 25.5 | ○ | Invention Example |
| 20 | 7.8 | ○ | 27.3 | ○ | Invention Example |
| 21 | 2.9 | x | 18.0 | ○ | Comparative Example |
| 22 | 7.1 | ○ | 16.9 | ○ | Invention Example |
| 23 | 4.9 | ○ | 14.5 | ○ | Invention Example |

*1. ○: 3.4 kN or greater
x: less than 3.4 kN
*2. ○: 6.4 kN or greater
x: less than 6.4 kN

TABLE 4-2

| | Evaluation results | | | | |
|---|---|---|---|---|---|
| Welding No. | CTS (kN) | CTS rating [*1] | TSS (kN) | TSS rating [*2] | Notes |
| 24 | 6.5 | ○ | 16.1 | ○ | Invention Example |
| 25 | 5.1 | ○ | 15.1 | ○ | Invention Example |
| 26 | 3.8 | ○ | 7.3 | ○ | Invention Example |
| 27 | 3.6 | ○ | 6.7 | ○ | Invention Example |
| 28 | 2.8 | x | 4.5 | x | Comparative Example |
| 29 | 6.1 | ○ | 12.3 | ○ | Invention Example |
| 30 | 6.5 | ○ | 14.5 | ○ | Invention Example |
| 31 | 6.8 | ○ | 15.5 | ○ | Invention Example |
| 32 | 3.5 | ○ | 6.6 | ○ | Invention Example |
| 33 | 3.7 | ○ | 6.9 | ○ | Invention Example |
| 34 | 2.8 | x | 4.8 | x | Comparative Example |
| 35 | 2.1 | x | 5.3 | x | Comparative Example |
| 36 | 4.6 | ○ | 7.3 | ○ | Invention Example |
| 37 | 1.9 | x | 4.9 | x | Comparative Example |
| 38 | 2.1 | x | 7.5 | ○ | Comparative Example |
| 39 | 2.3 | x | 7.6 | ○ | Comparative Example |
| 40 | 5.2 | ○ | 12.3 | ○ | Invention Example |
| 41 | 4.8 | ○ | 11.4 | ○ | Invention Example |
| 42 | 5.2 | ○ | 12.5 | ○ | Invention Example |
| 43 | 5.3 | ○ | 12.7 | ○ | Invention Example |
| 44 | 5.6 | ○ | 21.1 | ○ | Invention Example |
| 45 | 6.2 | ○ | 22.4 | ○ | Invention Example |
| 46 | 5.8 | ○ | 20.1 | ○ | Invention Example |
| 47 | 6.4 | ○ | 21.5 | ○ | Invention Example |

*1. ○: 3.4 kN or greater
x: less than 3.4 kN
*2. ○: 6.4 kN or greater
x: less than 6.4 kN As shown in Tables 4-1 and 4-2, resistance spot welded joints having a good CTS and a good TSS could be obtained in Invention Examples, in which resistance spot welding was performed in accordance with embodiments of the invention. In contrast, in Comparative Examples, in which the welding conditions did not conform to those described herein, the joints obtained were not good in terms of at least one of CTS and TSS.

REFERENCE SIGNS LIST

1 Lower steel sheet
2 Upper steel sheet
3 Sheet combination
4 Lower welding electrode
5 Upper welding electrode
6 Nugget

The invention claimed is:

1. A method for manufacturing a resistance spot welded joint, the method comprising:
   holding a sheet combination between a pair of welding electrodes, the sheet combination including at least two overlapping steel sheets; and
   applying a current, together with a force, from the pair of welding electrodes to the sheet combination in a main current application step and a tempering post-heat treatment step, thereby joining together the at least two overlapping steel sheets, wherein
   the main current application step includes applying a current at a current value $I_w$ (kA),
   the tempering post-heat treatment step includes (i) a cooling process, (ii) a heating process, and (iii) at least one process selected from the group consisting of (a) a transition process and (b) a holding process,
   in the cooling process, a cooling time $t_{ct}$ (ms), shown in formula (1) below, is provided,
   in the heating process, a current is applied at a current value $I_t$ (kA), shown in formula (2) below, for a current application time $t_t$ (ms), shown in formula (3) below,
   in the transition process, a current that is applied is continuously reduced from the current value $I_t$ (kA) to a current value $I_{tm}$ (kA), shown in formula (5) below, for a down-slope current application time $t_{tma}$ (ms), shown in formula (4) below, and
   in the holding process, a current is applied to a weld at the current value $I_{tm}$ (kA), shown in formula (5) below, for a current application time $t_{tm}$ (ms), shown in formula (6) below, $$800 \leq t_{ct} \quad (1)$$

$$0.8 \times I_w \leq I_t \leq 1.6 \times I_w \quad (2)$$

$$0 < t_t \leq 200 \quad (3)$$

$$0 < t_{tma} \leq 400 \quad (4)$$

$$0 \leq I_{tm} \leq 0.90 \times I_t \quad (5)$$

$$400 \leq t_t + t_{tma} + t_{tm} \quad (6)$$

where, in an instance in which the transition process is not included, $t_{tma}$ in formula (4) and formula (6) is 0 ms, and in an instance in which the holding process is not included, $I_{tm}$ in formula (5) is 0 kA, and $t_{tm}$ in formula (6) is 0 ms, and
wherein at least one of the steel sheets in the sheet combination is a high strength steel sheet that has a chemical composition comprising, in mass %, C: 0.05 to 0.60% and Mn: 1.5 to 6.0%, and has a tensile strength of 780 MPa or greater.

2. The method according to claim 1, wherein the chemical composition of the high strength steel sheet additionally contains one or more selected from the group consisting of Cu, Ni, Mo, Cr, Nb, V, Ti, B, Al, and Ca (Group B elements), and a total content of the Group B elements in the high strength steel sheet is less than or equal to 5%.

3. The method according to claim 1, wherein the chemical composition of the high strength steel sheet additionally contains, in mass %, (i) Si: 0.1 to 2.0%, and (ii) P: 0.10% or less.

4. The method according to claim 2, wherein the chemical composition of the high strength steel sheet additionally contains, in mass %, (i) Si: 0.1 to 2.0%, and (ii) P: 0.10% or less.

* * * * *